(12) United States Patent
Honegger

(10) Patent No.: US 8,556,066 B2
(45) Date of Patent: Oct. 15, 2013

(54) BULK MATERIAL LEVELING AND VOLUMETRIC MEASURING AND FEEDING APPARATUS

(75) Inventor: Chris Allen Honegger, Bluffton, IN (US)

(73) Assignee: Rethceif Enterprises, Inc., Bluffton, IN (US)

(*) Notice: Subject to any disclaimer, the term of this patent is extended or adjusted under 35 U.S.C. 154(b) by 357 days.

(21) Appl. No.: 13/066,282

(22) Filed: Apr. 11, 2011

(65) Prior Publication Data

US 2012/0255834 A1   Oct. 11, 2012

(51) Int. Cl.
B65G 15/00 (2006.01)
B65G 47/00 (2006.01)

(52) U.S. Cl.
USPC .................. 198/550.3; 198/550.2; 198/550.5; 198/670; 198/671

(58) Field of Classification Search
USPC ........... 198/527, 530, 532, 533, 550.2, 550.3, 198/550.5, 550.6, 658, 660, 662, 663, 670, 198/671; 222/40, 46, 55, 240, 290, 308
See application file for complete search history.

(56) References Cited

U.S. PATENT DOCUMENTS

| | | | |
|---|---|---|---|
| 1,647,704 A | 11/1927 | Lea | |
| 2,312,216 A | 2/1943 | Keeler | |
| 3,199,793 A | 8/1965 | Sabi | |
| 3,362,585 A * | 1/1968 | Nessim et al. | 222/55 |
| 3,709,351 A | 1/1973 | Oldershaw et al. | |
| 3,714,948 A | 2/1973 | Sears et al. | |
| 4,108,301 A * | 8/1978 | Trozzi | 198/633 |
| 4,194,615 A * | 3/1980 | Tell et al. | 198/524 |
| 4,203,513 A | 5/1980 | Scheppele | |
| 4,232,719 A | 11/1980 | Payton | |
| 4,257,518 A * | 3/1981 | Stock et al. | 222/55 |
| 4,323,178 A * | 4/1982 | Longinotti | 222/415 |
| 4,432,499 A * | 2/1984 | Henkensiefken et al. | 241/30 |
| 4,509,862 A * | 4/1985 | High et al. | 366/299 |
| 4,580,698 A | 4/1986 | Ladt et al. | |
| 4,821,782 A * | 4/1989 | Hyer | 141/83 |
| 5,109,894 A * | 5/1992 | McGregor | 141/83 |
| 5,626,218 A * | 5/1997 | Kamiwaki | 198/518 |
| 5,657,902 A * | 8/1997 | Kraus | 222/56 |
| 5,735,386 A * | 4/1998 | Epp et al. | 198/550.01 |

(Continued)

FOREIGN PATENT DOCUMENTS

GB    2 015 179 A    9/1979

*Primary Examiner* — Douglas Hess
(74) *Attorney, Agent, or Firm* — George Pappas

(57) ABSTRACT

A bulk material leveling and volumetric measuring and feeding apparatus includes a conveyor for transporting bulk material from a hopper to a leveling assembly. The leveling assembly includes a pair of augers located perpendicular to the conveyor and with the auger terminal ends at a desired height from the conveyor. Side walls are provided parallel to the conveyor direction of travel and extend up to the auger terminal ends. Each auger is positioned within a semicircular longitudinal channel of a trough. Bulk material being transported and which is located above the augers terminal ends is lifted by the augers and thrown back towards the hopper. Thus, bulk material being transported under and beyond the leveling assembly is maintained at a desired depth. By monitoring and/or controlling the conveyor speed and the depth of the transported bulk material, the volumetric feed rate and total volume of transported material can be determined and/or controlled. The height of the leveling assembly above the conveyor is selectively adjustable. A shutoff gate is provided downstream of the leveling assembly.

28 Claims, 6 Drawing Sheets

(56) References Cited

U.S. PATENT DOCUMENTS

| | | | |
|---|---|---|---|
| 6,074,298 A | 6/2000 | Majkrzak et al. | |
| 6,390,280 B1 * | 5/2002 | Boyce | 198/540 |
| 6,722,491 B2 * | 4/2004 | Forsberg | 198/658 |
| 6,736,258 B2 * | 5/2004 | Noda et al. | 198/550.3 |
| 6,948,535 B2 * | 9/2005 | Stegemoeller | 141/67 |
| 7,147,361 B2 * | 12/2006 | Cecala et al. | 366/132 |
| 7,275,893 B2 * | 10/2007 | Rexius et al. | 406/197 |
| 7,314,131 B2 * | 1/2008 | Olds | 198/671 |
| 7,462,279 B2 * | 12/2008 | Dixon et al. | 210/170.09 |
| 8,100,095 B2 * | 1/2012 | McKnight et al. | 123/23 |

* cited by examiner

BULK MATERIAL LEVELING AND VOLUMETRIC MEASURING AND FEEDING APPARATUS

BACKGROUND OF THE INVENTION

1. Field of the Invention

The present invention relates to the field of conveying bulk materials such as insulation, compost, mulch, peat moss, sawdust, corn, grains, etc. More particularly, the present invention relates to the field of leveling the top surface and hence controlling the depth of bulk material being transported on a conveyor and, by monitoring and controlling the depth of the bulk material on the conveyor and the speed of the conveyor, thereby monitoring and/or controlling the volume of bulk material being transported by the conveyor.

2. Description of Related Art

Bulk material such as insulation, compost, mulch, peat moss, sawdust, corn, grains, etc., is commonly transported on conveyors and, more particularly, belt conveyors. In connection therewith, it is often also desirable to measure and/or control the volume of the bulk material being transported by the conveyor. That is, it is often desirable to measure and/or control the volumetric feed rate at which the bulk material is being transported by the conveyor. It is known that by measuring and/or controlling the speed of the conveyor and the cross sectional area of the bulk material being transported by the conveyor, the volumetric feed rate can be determined and/or controlled.

The cross sectional area of the bulk material being transported is established and/or is bound by the width of the conveyor surface, the height of side walls which extend longitudinally along the conveyor and which maintain the bulk material on the conveyor, and the depth of the bulk material over the conveyor surface. Typically, the width of the conveyor surface and the height of the side walls are fixed, and the depth of the bulk material is controlled by leveling the top surface thereof to a desired height over the conveyor carrying surface. Of course, when leveling the top surface of the bulk material being transported on the conveyor, care must be taken to maintain a generally consistent density.

Prior bulk material leveling and volumetric measuring and/or feeding apparatus traditionally used a "gate" for essentially scraping excess bulk material and for thereby leveling the bulk material top surface at a desired height. For example, Lea U.S. Pat. No. 1,647,704 and Keeler U.S. Pat. No. 2,312,216 disclose volumetric measuring and feeding apparatus wherein granular bulk material is transported on a conveyor between side walls, and one or more gates are provided for leveling off the top surface of the bulk material as it is being transported via the conveyor. With the cross-sectional area of the bulk material and speed of the conveyor, the volumetric feed rate can be measured and/or controlled. However, depending on the quantity and overall height of bulk material behind the gates and the consistency of the bulk material, the density of the bulk material being transported will vary. Additionally, if an excess amount of bulk material is provided behind the gate, the weight thereof can sometimes cause the material to bind at the gate thereby causing it to plug up.

Sabi U.S. Pat. No. 3,199,793 discloses a gate like structure wherein knives are rotatably secured to a horizontal shaft which is located perpendicular to the conveyor longitudinal axis and over the bulk material being transported. As the bulk material approaches the rotating knives, the top surface is leveled off and excess bulk material is thrown backwardly. However, depending on the consistency of the material, the knives can compress the material and cause inconsistent densities. Moreover, in the event excess bulk material accumulates at a height above the knives horizontal shaft, the bulk material will be thrown forwardly instead.

Accordingly, an improved bulk material leveling and volumetric measuring and feeding apparatus is desired wherein the top surface of the bulk material being transported on a conveyor can be leveled at a desired height while maintaining the density of the bulk material thereunder generally consistent, and wherein the apparatus is generally not affected by excess bulk material that may accumulate behind the leveling apparatus.

SUMMARY OF THE INVENTION

The present invention overcomes the disadvantages of prior bulk material leveling and volumetric measuring and feeding apparatus and provides additional advantages and benefits as described herein below.

In one form thereof, the present invention is directed to a bulk material leveling apparatus including a conveyor having a bulk material carrying surface adapted to transport bulk material thereon. An auger is provided having a longitudinal axis and a terminal end. The auger is selectively rotationally driven about its longitudinal axis. The auger terminal end is positioned at a distance from the conveyor carrying surface, whereby bulk material being transported on the conveyor above the distance is lifted by the auger terminal end for thereby leveling the bulk material.

Preferably, the auger includes helical flighting extending along its longitudinal axis and the flighting terminates at the auger terminal end along an edge located substantially perpendicular to the longitudinal axis. A trough is provided having a longitudinal channel opening and a terminal open end, and the auger is positioned parallel to and within the trough longitudinal channel opening and with the auger terminal end and the trough terminal open end being generally aligned. The auger longitudinal axis is preferably substantially perpendicular to the conveyor carrying surface. Additionally, the conveyor preferably transports bulk material toward a conveyor terminal end, and a shutoff gate is provided proximate the conveyor terminal end. The shutoff gate is selectively movable between an open position allowing bulk material to be transported by the conveyor and a closed position blocking bulk material from being transported by the conveyor. Furthermore, side walls are located adjacent the conveyor substantially parallel to the longitudinal direction of travel of the bulk material. The side walls extend above the conveyor surface at least to the auger terminal end. The conveyor can be operated at a transport speed and the volume of transported bulk material can be determined by monitoring the conveyor transport speed and the distance of the auger terminal end above the conveyor surface. Alternatively, the conveyor can be operated at a transport speed and the volume of transported bulk material can be controlled by controlling the conveyor transport speed and the distance of the auger terminal end above the conveyor surface.

In another form thereof, the present invention is directed to a bulk material leveling apparatus including a conveyor having a bulk material carrying surface adapted to transport bulk material thereon. First and second augers are provided, wherein each auger has a longitudinal axis and a terminal end. The augers are selectively rotationally driven about their respective longitudinal axes. The terminal ends of the augers are positioned at a distance from the conveyor carrying surface. Bulk material being transported on the conveyor above the distance is lifted by the auger terminal ends for thereby leveling the bulk material.

In yet another form thereof, the present invention is directed to a bulk material leveling apparatus including a conveyor having a bulk material carrying surface adapted to transport bulk material thereon in a longitudinal direction. First and second augers are provided and located substantially parallel to one another and perpendicular to the conveyor carrying surface. Each auger has a longitudinal axis and a terminal end. The augers are selectively rotationally driven about their respective longitudinal axes in opposite directions relative to one another. The terminal ends of the augers are positioned at a distance from the conveyor carrying surface. Bulk material being transported on the conveyor above the distance is lifted by the auger terminal ends for thereby leveling the bulk material. Each auger includes substantially helical shaped flighting extending along its longitudinal axis. The flighting terminates at the auger terminal end along an edge located substantially perpendicular to its longitudinal axis. First and second troughs are also provided. Each trough has a longitudinal channel opening and a terminal open end. The first auger is positioned parallel to and within the first trough longitudinal channel opening and the second auger is positioned parallel to and within said second trough longitudinal channel opening. The auger terminal ends and the trough terminal open ends are generally horizontally aligned. Side walls are located adjacent the conveyor substantially parallel to the longitudinal direction of travel of the conveyor. The side walls extend above the conveyor surface at least to the augers terminal ends.

Preferably, the conveyor is operated at a transport speed and the volume of transported bulk material is determined by monitoring the conveyor transport speed and the distance of the augers terminal ends above the conveyor surface. Alternatively, the conveyor is operated at a transport speed and the volume of transported bulk material is controlled by controlling the conveyor transport speed and the distance of the augers terminal ends above the conveyor surface. Yet more preferably, the conveyor transports bulk material toward a conveyor terminal end, and a shutoff gate is provided proximate the conveyor terminal end. The shutoff gate is selectively movable between an open position allowing bulk material to be transported by the conveyor and a closed position blocking bulk material from being transported by the conveyor.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, wherein.

Figure 1:
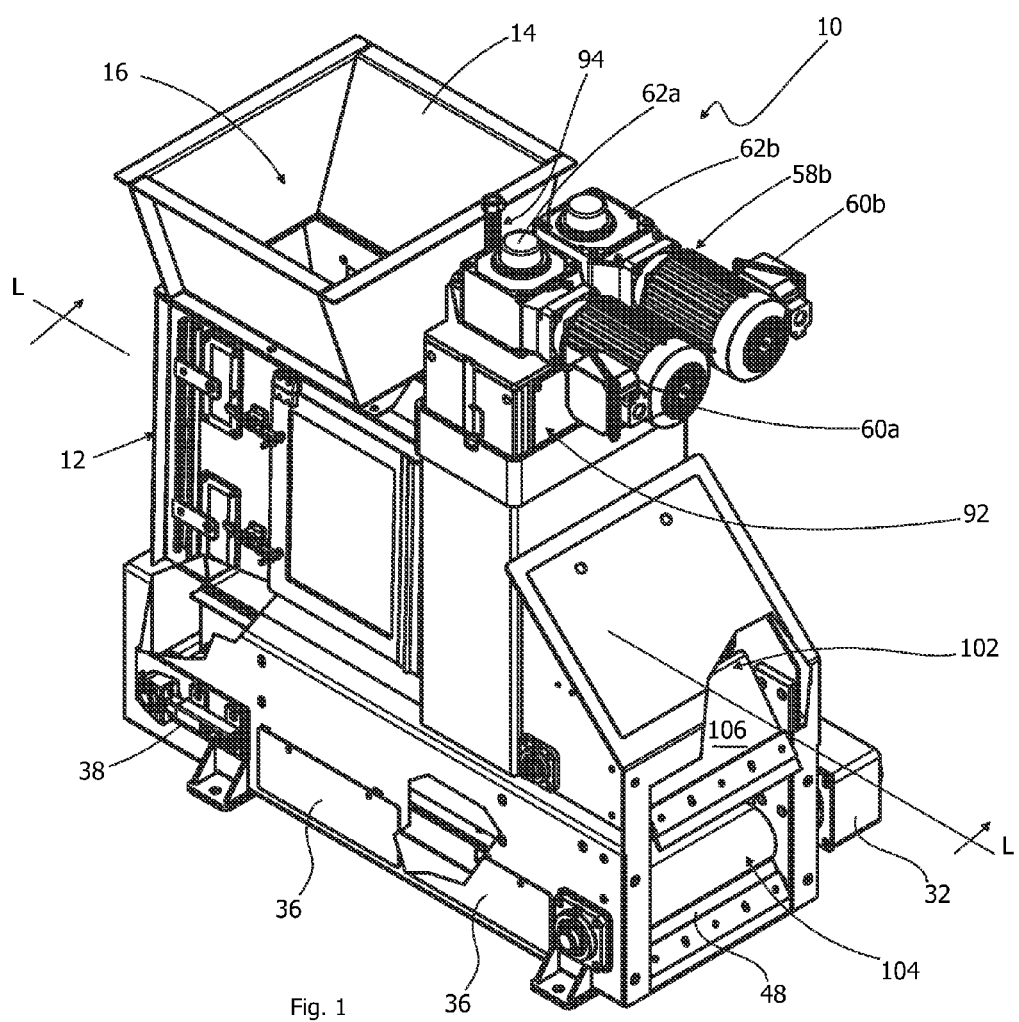
FIG. 1 is a perspective view of a bulk material leveling and volumetric measuring and feeding apparatus constructed in accordance with the principles of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE PREFERRED EMBODIMENT

A bulk material leveling and volumetric measuring and feeding apparatus constructed in accordance with the principles of the present invention is shown in FIG. 1 and generally designated by the numeral 10. Apparatus 10 includes a housing which defines a hopper 12. A hopper chute 14 provides an opening 16 through which bulk material may be loaded into the hopper 12.

A conveyor 18 is provided at the bottom of hopper 12 and is adapted to transport the bulk material in a longitudinal direction, as indicated by arrow A, toward the auger leveling assembly 20. Conveyor 18 includes a front roller 22, rear roller 24 and a flexible belt 26 extending therearound. Rollers 22, 24 are mounted in the apparatus housing and rotatably carry the flexible belt 26 in a known and customary manner. A conveyor belt drive assembly 28 including an electric motor 30 and gearbox 32 is coupled to the front roller 22 for thereby driving the conveyor flexible belt 26 as indicated by arrow A. The rotational speed of electric motor 30 can be both controlled and measured for thereby controlling and measuring the speed of the flexible belt 26 and, hence, the transport speed of the bulk material carried on the conveyor carrying surface 34 (the upper surface of the conveyor 18 whereupon the bulk material is supported while being transported).

It is noted that a pair of take up assemblies 38 are secured between the housing and the rear roller 24 for selectively adjusting the pitch and longitudinal location of the rear roller 24, and for thereby selectively adjusting the tension of the flexible belt 26 as well as its lateral position for maintaining it generally centered on the rollers 22, 24. Removable access doors 36 are also provided on the housing adjacent the conveyor 18 for gaining access thereto and servicing as needed.

Figure 5:
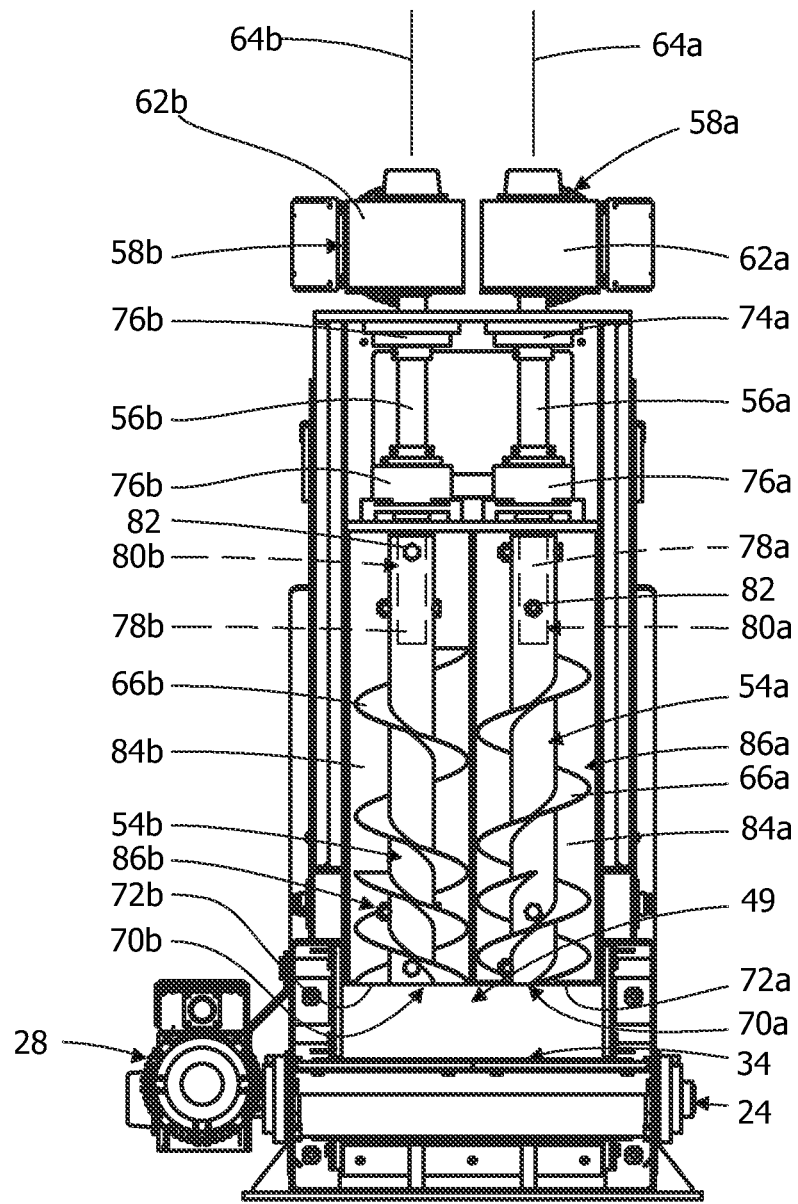
FIG. 5 is a cross-sectional view taken along line B-B of FIG. 3.
Figure 6:
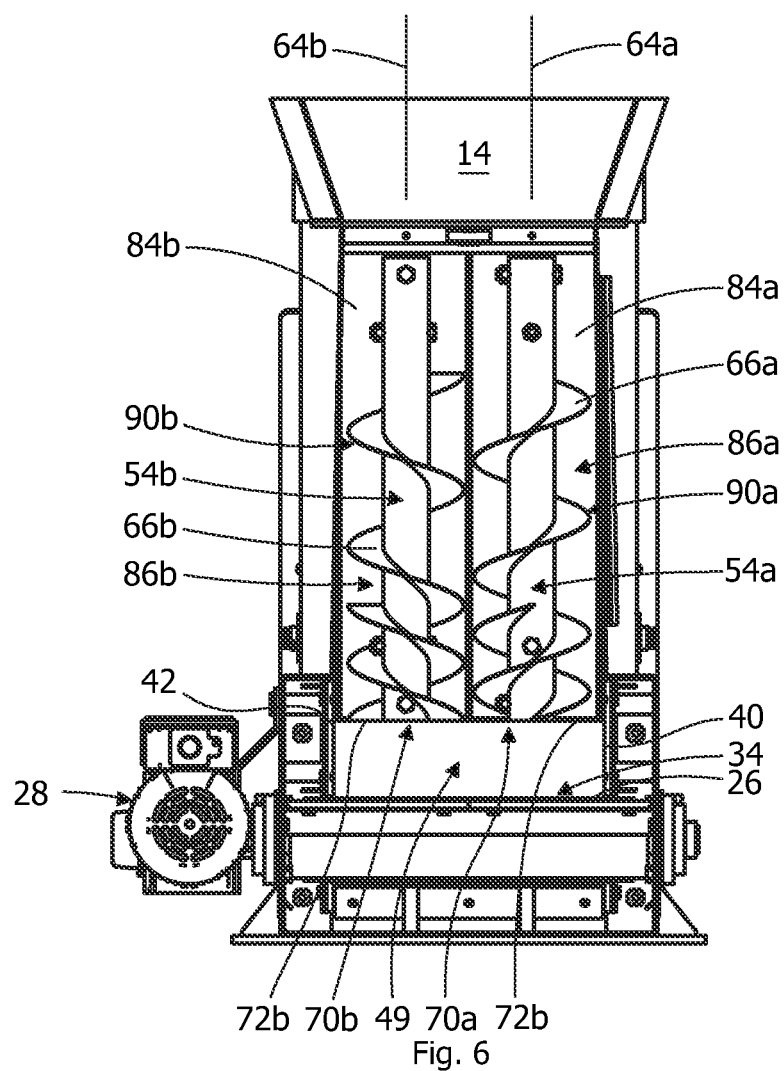
FIG. 6 is a cross-sectional view taken along line C-C of FIG. 3.

Above the conveyor 18, the bulk material is maintained on the conveyor carrying surface 34 with a pair of side walls 40, 42 and a rear wall 44. Side walls 40, 42 are substantially parallel to the longitudinal direction of the conveyor 18 and extend generally vertically and perpendicular to the conveyor carrying surface 34. As best seen in FIGS. 5 and 6, the conveyor belt 26 extends laterally beyond and underneath the side walls 40, 42. Belt 26 slidingly engages the bottom edge of side walls 40, 42 for thereby preventing bulk material from exiting therebetween. The side walls 40, 42 are provided with a low friction surface 46 so that bulk material being transported by the conveyor 18 will more readily slide thereover.

The rear wall 44 extends between the side walls 40, 42 and also extends generally vertically and perpendicular to the conveyor carrying surface 34. Belt 26 also slidingly engages the bottom edge of the rear wall 44 for thereby preventing bulk material from exiting therebetween. Hence, rear wall 44 prevents bulk material from falling backwardly off of the conveyor 18.

Figure 2:
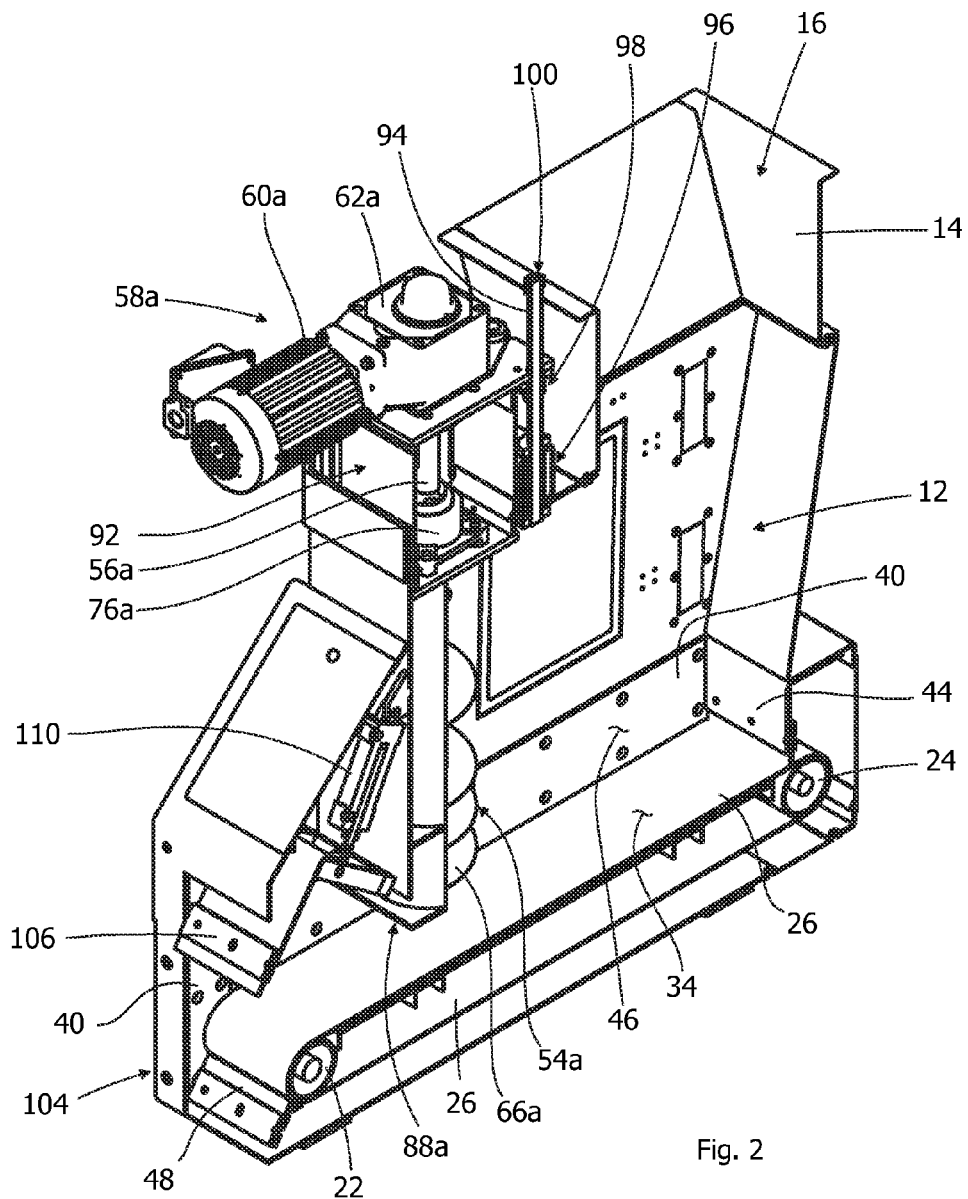
FIG. 2 is cross-sectional perspective view taken along line L-L of FIG. 1.
Figure 3:
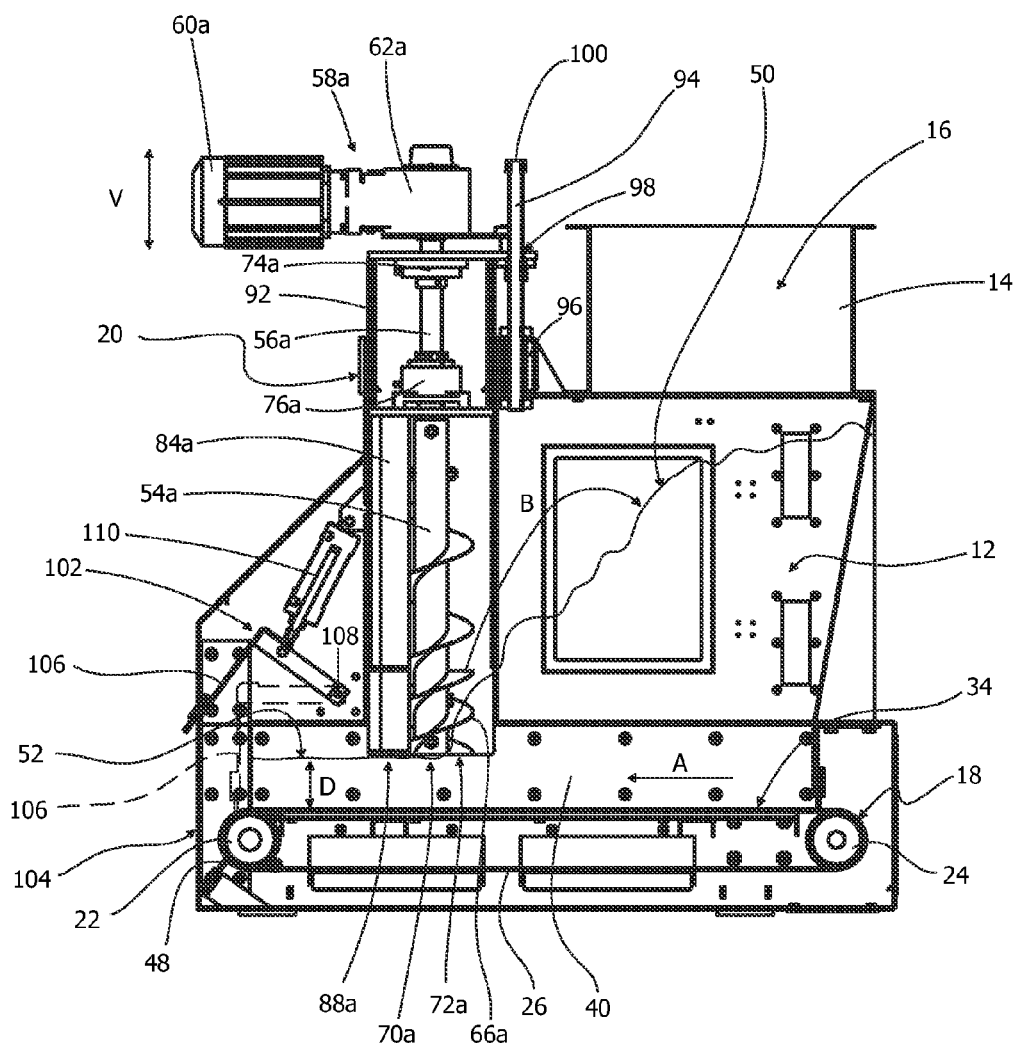
FIG. 3 is a cross-sectional view taken along line L-L of FIG. 1.

At the other longitudinal end of conveyor 18, as best seen in FIGS. 2 and 3, there is provided a rubber wiper 48 extending laterally across the belt 26 and between the side walls 40, 42. Rubber wiper 48 slidingly engages the conveyor belt 26 and serves to wipe any bulk material off therefrom, and thereby prevents bulk material from traveling underneath the conveyor 18.

As should now be appreciated, the side walls 40, 44 and conveyor 18 therebelow form a trough 49 wherein bulk material falls from the hopper 12. The conveyor 18 transports the bulk material longitudinally along the trough 49 toward the auger leveling assembly 20 which, as more fully described herein below, acts as a "gate" scraping and leveling the top surface of the material traveling thereunder to a desired height from the conveyor carrying surface 34. That is, as diagrammatically depicted in FIG. 3, bulk material within hopper 12 filled to a level depicted by line 50 falls into trough 49 and is transported toward the auger leveling assembly 20 whereat the top surface thereof is scraped and leveled off to a height or top surface depicted by line 52. Accordingly, all bulk material being transported and exiting the hopper 12 has a depth D defined by the bulk material top surface depicted by line 52.

The auger leveling assembly 20 is selectively vertically adjustable for thereby selectively adjusting the desired depth D of the bulk material being transported thereunder. Auger leveling assembly 20 preferably includes a pair of augers 54*a*, 54*b*, although a single auger will work as well. Augers 54*a*, 54*b* are coupled via respective shaft extensions 56*a*, 56*b* to respective auger drive assemblies 58*a*, 58*b*. Shaft extensions 56*a*, 56*b* are journaled between upper bearing 74*a*, 74*b* and lower bearing 76*a*, 76*b* mounted in the auger leveling assembly 20. Shaft extensions 56*a*, 56*b* include a lower extremity 78*a*, 78*b* extending below the lower bearing 76*a*, 76*b*. Augers 54*a*, 54*b* are provided with an upper longitudinal bore 80*a*, 80*b* adapted to receive a respective lower extremity 78*a*, 78*b* and be secured thereto with fasteners 82. Accordingly, augers 54*a*, 54*b* depend/hang down from shaft extensions 56*a*, 56*b* and are preferably not journaled at their lower terminal ends 70*a*, 70*b*.

Figure 4:
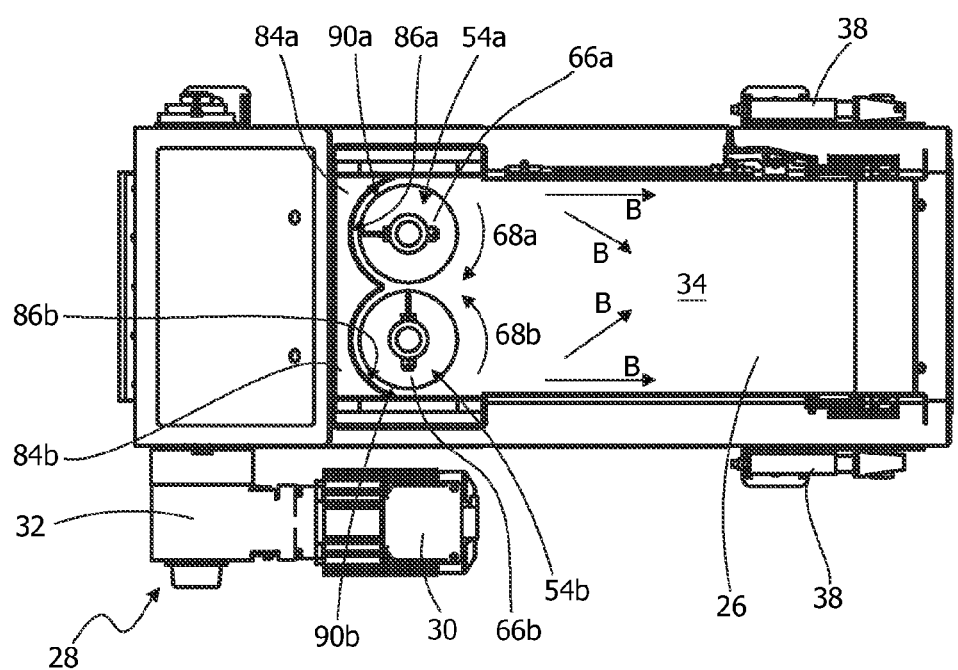
FIG. 4 is a cross-sectional view taken along line A-A of FIG. 3.

Drive assemblies 58*a*, 58*b* each include an electric motor 60*a*, 60*b* and gear box 62*a*, 62*b* whereby the augers 54*a*, 54*b* are selectively rotatably driven about their longitudinal axes 64*a*, 64*b*. As best seen in FIG. 4, the augers are rotatably driven in opposite directions. Auger 54*a* is rotatably driven in a clockwise direction as viewed from the top as indicated by arrow 68*a*, and auger 54*b* is driven in a counterclockwise direction as viewed from the top as indicated by arrow 68*b*.

Each of the augers 54*a*, 54*b* is provided with helical flighting 66*a*, 66*b* extending along its respective longitudinal axis 64*a*, 64*b*. Each of the flighting 66*a*, 66*b* terminates at its auger respective terminal end 70*a*, 70*b* along an edge 72*a*, 72*b* which is substantially perpendicular to the longitudinal axis 64*a*, 64*b*. Edges 72*a*, 72*b* are preferably hardened for cutting into the bulk material. As best seen in FIGS. 5 and 6, the helical flighting 66*a* of auger 54*a* extends/wraps around its axis 64*a* in a clockwise direction as viewed from the top. Accordingly, as auger 54*a* is rotatably driven in a clockwise direction 68*a*, its terminal edge 72*a* cuts into the bulk material and its helical flighting 66*a* lifts the bulk material upwardly. Similarly, the helical flighting 66*b* of auger 54*b* extends/wraps around its axis 64*b* in a counterclockwise direction as viewed from the top. Accordingly as auger 54*b* is rotatably driven in a counterclockwise direction 68*b*, its terminal edge 72*b* cuts into the bulk material and its helical flighting 66*b* lifts the bulk material upwardly. It is noted also that bulk material being transported by conveyor 18 and which is vertically above the augers terminal edges 72*a*, 72*b* will directly come into contact with the helical flighting 66*a*, 66*b* and will similarly be lifted upwardly.

The auger leveling assembly 20 further includes vertically oriented troughs 84*a*, 84*b* which are provided with longitudinal channel openings 86*a*, 86*b* and terminal ends 88*a*, 88*b*. As best seen in FIG. 4, the longitudinal channel openings 86*a*, 86*b* are semicircular shaped in cross-section and the augers 54*a*, 54*b* are positioned parallel to and within their respective longitudinal channel openings 86*a*, 86*b* with the helical flighting outer circumferential edges 90*a*, 90*b* in generally close proximity to the semicircular surface forming the longitudinal channel openings 86*a*, 86*b*. As best seen in FIG. 3, the terminal open ends 88*a*, 88*b* of the troughs 84*a*, 84*b* are horizontally aligned with the flighting edges 72*a*, 72*b* at the terminal ends 70*a*, 70*b* of augers 54*a*, 54*b*.

As should now be appreciated, the augers 54*a*, 54*b* are parallel to one another as well as to the troughs 84*a*, 84*b*. The augers 54*a*, 54*b* and the troughs 84*a*, 84*b* are perpendicular to the conveyor carrying surface 34, and the augers flighting terminal edges 72*a*, 72*b* are parallel to the conveyor carrying surface 34.

As bulk material is transported by the conveyor 18 from the hopper 12 and the trough 49, any bulk material above the augers terminal end edges 72*a*, 72*b* (above the distance/depth D) will be lifted by the augers and thrown backwardly toward the hopper 12. More particularly, in view of auger 54*a* being driven clockwise and auger 54*b* being driven counterclockwise, excess bulk material which is lifted upwardly is directed outwardly along the semicircular surfaces 86*a*, 86*b* and is thrown backwardly toward hopper 12 as indicated by arrows B in FIGS. 3 and 4. Accordingly, the bulk material which is transported longitudinally beyond the augers 54*a*, 54*b* will have a level upper surface 52 and a depth D. Moreover, because the augers act to lift the excess bulk material upwardly and throw it backwardly into the hopper 12, the density of the bulk material being transported at the depth D will tend to be more consistent.

As should now also be appreciated, the bulk material which is transported under and beyond the auger leveling assembly 20 will have a rectangular cross-sectional area with sides defined by the distance between the side walls 40, 42 and the distance between the conveyor belt carrying surface 34 and the augers terminal ends 70*a*, 70*b* (depth D). Accordingly, by also monitoring and/or controlling the transport speed of the conveyor 18, the volumetric feed rate of the transported bulk material and the total volume of transported bulk material can be monitored and/or controlled as may be needed or desired.

The auger leveling assembly 20 is preferably selectively vertically adjustable for thereby adjusting the height of the augers terminal ends 70*a*, 70*b* from the conveyor carrying surface 34 and, hence, the desired depth D of the transported bulk material. In this regard, the leveling assembly 20 comprises a frame 92 whereupon the leveling assembly components are mounted and the frame 92 is adapted to slide vertically upwardly and downwardly relative to the apparatus housing and the conveyor 18 as indicated by arrows V. The frame 92 is maintained in its vertical position with a threaded shaft 94 which is journaled in a bearing 96 secured to the apparatus housing. The frame 92 includes a threaded bore 98. Shaft 94 extends through and threadingly engages the threaded bore 98. The upper end of the threaded shaft 94 is provided with a tool engagement surface 100 whereby a tool may be used to engage and rotate the threaded shaft about its longitudinal axis. Thus, by selectively turning the threaded shaft 94 in a clockwise or counterclockwise direction, the leveling assembly 20 can be moved vertically as indicated by arrows V for thereby adjusting the bulk material depth D as needed or desired.

As best seen in FIGS. 2 and 3, a shut off gate assembly 102 is provided downstream of the leveling assembly 20 and proximate the conveyor terminal end 104. Gate assembly 102 includes an L-shaped shut off gate 106 which is pivotally secured to the apparatus housing at pivot axis 108 extending generally horizontally and parallel to the conveyor carrying surface 34. An air cylinder 110 is provided and is pivotally secured between the L-shaped gate 106 and the apparatus housing. Accordingly, by selectively extending or retracting the air cylinder 110, the L-shaped gate 106 can be selectively moved between an open position as shown in solid lines and a closed position as shown in dash lines. In operation, while the conveyor 18 is transporting bulk material, the shut off gate 106 is maintained in its open position allowing the bulk material to be transported and exit the apparatus. However, when the conveyor 18 is stopped, the shut off gate 106 is closed for thereby preventing bulk material from inadvertently falling off of the conveyor carrying surface 34 and providing a definitive stopping point of the bulk material being transported While this invention has been described as having an exemplary design, the present invention may be further modified within the spirit and scope of this disclosure. This application is therefore intended to cover any variations, uses, or adaptations of the invention using its general principles.

What is claimed is:

1. A bulk material leveling apparatus comprising:
a conveyor having a bulk material carrying surface adapted to transport bulk material thereon;
an auger having a longitudinal axis and a terminal end, said auger being selectively rotationally driven about its longitudinal axis; and,
wherein said auger terminal end is positioned at a distance from said conveyor carrying surface, whereby bulk material being transported on said conveyor above said distance is lifted by said auger terminal end for thereby leveling the bulk material.

2. The bulk material leveling apparatus of claim 1 wherein said auger includes helical flighting extending along its longitudinal axis and wherein said flighting terminates at said auger terminal end along an edge located substantially perpendicular to said longitudinal axis.

3. The bulk material leveling apparatus of claim 2 further comprising a trough having a longitudinal channel opening and a terminal open end, and wherein said auger is positioned parallel to and within said trough longitudinal channel opening and wherein said auger terminal end and said trough terminal open end are generally aligned.

4. The bulk material leveling apparatus of claim 1 wherein said auger longitudinal axis is substantially perpendicular to said conveyor carrying surface.

5. The bulk material leveling apparatus of claim 1 wherein said conveyor transports bulk material toward a conveyor terminal end, and further comprising a shutoff gate proximate said conveyor terminal end, said shutoff gate being selectively movable between an open position allowing bulk material to be transported by said conveyor and a closed position blocking bulk material from being transported by said conveyor.

6. The bulk material leveling apparatus of claim 1 wherein said conveyor is adapted to transport bulk material in a longitudinal direction, and further comprising side walls located adjacent said conveyor substantially parallel to said longitudinal direction.

7. The bulk material leveling apparatus of claim 6 wherein said side walls extend above said conveyor surface at least said distance and to said auger terminal end.

8. The bulk material leveling apparatus of claim 1 wherein said conveyor is operated at a transport speed and the volume of transported bulk material is determined by monitoring said conveyor transport speed and said distance of said auger terminal end above said conveyor surface.

9. The bulk material leveling apparatus of claim 8 wherein said conveyor is adapted to transport bulk material in a longitudinal direction, and further comprising side walls located adjacent said conveyor substantially parallel to said longitudinal direction and extending above said conveyor surface at least said distance and to said auger terminal end.

10. The bulk material leveling apparatus of claim 1 wherein said conveyor is operated at a transport speed and the volume of transported bulk material is controlled by controlling said conveyor transport speed and the distance of said auger terminal end above said conveyor surface.

11. The bulk material leveling apparatus of claim 10 wherein said conveyor is adapted to transport bulk material in a longitudinal direction, and further comprising side walls located adjacent said conveyor substantially parallel to said longitudinal direction and extending above said conveyor surface at least said distance and to said auger terminal end.

12. A bulk material leveling apparatus comprising:
a conveyor having a bulk material carrying surface adapted to transport bulk material thereon;
first and second augers, wherein each said auger has a longitudinal axis and a terminal end, said augers being selectively rotationally driven about their respective longitudinal axes; and,
wherein said terminal ends of said augers are positioned at a distance from said conveyor carrying surface, whereby bulk material being transported on said conveyor above said distance is lifted by said auger terminal ends for thereby leveling the bulk material.

13. The bulk material leveling apparatus of claim 12 wherein each said auger includes helical flighting extending along its longitudinal axis and wherein said flighting terminates at the auger terminal end along an edge located substantially perpendicular to its longitudinal axis.

14. The bulk material leveling apparatus of claim 13 further comprising first and second troughs, each trough having a longitudinal channel opening and a terminal open end, wherein said first auger is positioned parallel to and within said first trough longitudinal channel opening and said second auger is positioned parallel to and within said second trough longitudinal channel opening, and wherein said auger terminal ends and said trough terminal open ends are generally horizontally aligned.

15. The bulk material leveling apparatus of claim 12 wherein said augers longitudinal axes are substantially parallel to one another and perpendicular to said conveyor carrying surface.

16. The bulk material leveling apparatus of claim 12 wherein said conveyor transports bulk material toward a conveyor terminal end, and further comprising a shutoff gate proximate said conveyor terminal end, said shutoff gate being selectively movable between an open position allowing bulk material to be transported by said conveyor and a closed position blocking bulk material from being transported by said conveyor.

17. The bulk material leveling apparatus of claim 12 wherein said first and second augers are rotatably driven about their longitudinal axes in opposite directions relative to one another.

18. The bulk material leveling apparatus of claim 12 wherein said conveyor is adapted to transports bulk material in a longitudinal direction, and further comprising side walls located adjacent said conveyor substantially parallel to said longitudinal direction.

19. The bulk material leveling apparatus of claim 18 wherein said side walls extend above said conveyor surface at least said distance and to said augers terminal ends.

20. The bulk material leveling apparatus of claim 12 wherein said conveyor is operated at a transport speed and the volume of transported bulk material is determined by monitoring said conveyor transport speed and said distance of said augers terminal ends above said conveyor surface.

21. The bulk material leveling apparatus of claim 20 wherein said conveyor is adapted to transport bulk material in a longitudinal direction, and further comprising side walls located adjacent said conveyor substantially parallel to said longitudinal direction and extending above said conveyor surface at least said distance and to said augers terminal ends.

22. The bulk material leveling apparatus of claim 12 wherein said conveyor is operated at a transport speed and the volume of transported bulk material is controlled by controlling said conveyor transport speed and the distance of said augers terminal ends above said conveyor surface.

23. The bulk material leveling apparatus of claim 22 wherein said conveyor is adapted to transport bulk material in a longitudinal direction, and further comprising side walls located adjacent said conveyor substantially parallel to said longitudinal direction and extending above said conveyor surface at least said distance and to said augers terminal ends.

24. The bulk material leveling apparatus of claim 12 wherein said first and second augers are located generally parallel to one another.

25. A bulk material leveling apparatus comprising:
- a conveyor having a bulk material carrying surface adapted to transport bulk material thereon in a longitudinal direction;
- first and second augers located substantially parallel to one another and perpendicular to said conveyor carrying surface, wherein each said auger has a longitudinal axis and a terminal end, said augers being selectively rotationally driven about their respective longitudinal axes in opposite directions relative to one another;
- wherein said terminal ends of said augers are positioned at a distance from said conveyor carrying surface, whereby bulk material being transported on said conveyor above said distance is lifted by said auger terminal ends for thereby leveling the bulk material;
- wherein each said auger includes substantially helical shaped flighting extending along its longitudinal axis and wherein said flighting terminates at the auger terminal end along an edge located substantially perpendicular to its longitudinal axis;
- first and second troughs, each trough having a longitudinal channel opening and a terminal open end, wherein said first auger is positioned parallel to and within said first trough longitudinal channel opening and said second auger is positioned parallel to and within said second trough longitudinal channel opening, and wherein said auger terminal ends and said trough terminal open ends are generally horizontally aligned; and,
- side walls located adjacent said conveyor substantially parallel to said longitudinal direction, said side walls extending above said conveyor surface at least said distance and to said augers terminal ends.

26. The bulk material leveling apparatus of claim 25 wherein said conveyor is operated at a transport speed and the volume of transported bulk material is determined by monitoring said conveyor transport speed and said distance of said augers terminal ends above said conveyor surface.

27. The bulk material leveling apparatus of claim 25 wherein said conveyor is operated at a transport speed and the volume of transported bulk material is controlled by controlling said conveyor transport speed and the distance of said augers terminal ends above said conveyor surface.

28. The bulk material leveling apparatus of claim 25 wherein said conveyor transports bulk material toward a conveyor terminal end, and further comprising a shutoff gate proximate said conveyor terminal end, said shutoff gate being selectively movable between an open position allowing bulk material to be transported by said conveyor and a closed position blocking bulk material from being transported by said conveyor.

* * * * *